United States Patent
Austin et al.

(10) Patent No.: US 10,823,474 B2
(45) Date of Patent: Nov. 3, 2020

(54) PERTURBATION OF EXPANSION VALVE IN VAPOR COMPRESSION SYSTEM

(71) Applicant: Carrier Corporation, Farmington, CT (US)

(72) Inventors: Matthew Austin, Indianapolis, IN (US); Mark W. Shoemaker, Brownsburg, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 419 days.

(21) Appl. No.: 15/602,881

(22) Filed: May 23, 2017

(65) Prior Publication Data

US 2017/0343260 A1 Nov. 30, 2017

Related U.S. Application Data

(60) Provisional application No. 62/340,684, filed on May 24, 2016.

(51) Int. Cl.
*F25B 49/02* (2006.01)

(52) U.S. Cl.
CPC ...... *F25B 49/025* (2013.01); *F25B 2600/025* (2013.01); *F25B 2600/111* (2013.01); *F25B 2600/21* (2013.01); *F25B 2600/2513* (2013.01); *F25B 2700/2116* (2013.01);
(Continued)

(58) Field of Classification Search
CPC ........ F25B 2600/025; F25B 2600/0253; F25B 2600/0271; F25B 2600/11; F25B 2600/111; F25B 2700/1931; F25B 2700/21152
See application file for complete search history.

(56) References Cited

U.S. PATENT DOCUMENTS

| 4,523,435 A | 6/1985 | Lord |
| 4,527,399 A | 7/1985 | Lord |

(Continued)

FOREIGN PATENT DOCUMENTS

| CN | 103277876 A | 9/2013 |
| EP | 1811249 A1 | 4/2002 |

(Continued)

OTHER PUBLICATIONS

Definition of Amplitude, Oxford English Dictionary,https://www.lexico.com/en/definition/amplitude, accessed Oct. 4, 2019 (Year: 2019).*

(Continued)

*Primary Examiner* — Cassey D Bauer
(74) *Attorney, Agent, or Firm* — Cantor Colburn LLP

(57) ABSTRACT

A vapor compression system includes a compressor, a first heat exchanger, an expansion valve and a second heat exchanger arranged serial refrigerant flow path; a first fan configured to direct air over the first heat exchanger; a controller coupled to the first fan and the compressor, the controller configured to: set a compressor discharge superheat limit; determine a compressor discharge superheat; compare the compressor discharge superheat to the compressor discharge superheat limit; and when the compressor discharge superheat is less than the compressor discharge superheat limit, the controller reducing at least one of a compressor speed and a first fan speed.

12 Claims, 2 Drawing Sheets

(52) U.S. Cl.
CPC .............. *F25B 2700/21152* (2013.01); *F25B 2700/21175* (2013.01); *Y02B 30/743* (2013.01)

(56) References Cited

U.S. PATENT DOCUMENTS

| | | | |
|---|---|---|---|
| 5,058,390 A * | 10/1991 | Sindermann | B64D 13/00 62/181 |
| 5,257,508 A * | 11/1993 | Powell | B60H 1/3205 62/180 |
| 5,381,669 A * | 1/1995 | Bahel | F25B 49/005 62/129 |
| 5,502,970 A | 4/1996 | Rajendran | |
| 5,884,494 A | 3/1999 | Okoren et al. | |
| 6,148,628 A | 11/2000 | Reason et al. | |
| 6,321,549 B1 | 11/2001 | Reason et al. | |
| 6,539,734 B1 | 4/2003 | Weyna | |
| 6,951,116 B2 | 10/2005 | Lee et al. | |
| 6,997,001 B2 | 2/2006 | Hirota | |
| 7,143,594 B2 | 12/2006 | Ludwig et al. | |
| 7,201,008 B2 | 4/2007 | Lifson et al. | |
| 7,905,098 B2 | 3/2011 | Pham | |
| 8,151,583 B2 | 4/2012 | Douglas | |
| 8,156,750 B2 | 4/2012 | Butorac et al. | |
| 8,539,786 B2 | 9/2013 | McSweeney | |
| 8,590,325 B2 | 11/2013 | Pham | |
| 8,813,511 B2 | 8/2014 | Kopko et al. | |
| 2006/0026980 A1* | 2/2006 | Drysdale | F01D 1/023 62/228.1 |
| 2006/0112702 A1 | 6/2006 | Martin et al. | |
| 2009/0090118 A1* | 4/2009 | Pham | F04C 18/0215 62/228.5 |
| 2014/0137585 A1 | 5/2014 | Lu et al. | |
| 2014/0229014 A1 | 8/2014 | Pham et al. | |
| 2015/0059373 A1 | 3/2015 | Maiello et al. | |
| 2015/0068231 A1 | 3/2015 | Rite et al. | |
| 2015/0292762 A1 | 10/2015 | Clanin et al. | |

FOREIGN PATENT DOCUMENTS

| | | |
|---|---|---|
| EP | 1275917 A2 | 1/2003 |
| KR | 20010114098 A | 12/2001 |

OTHER PUBLICATIONS

Definition of Frequency, Oxford English Dictionary, https://www.lexico.com/en/definition/frequency, accessed Oct. 4, 2019 (Year: 2019).*

"A Beginning HVAC Tech's Guide for Understanding Superheat", The News, https://www.achrnews.com/articles/141034-a-beginning-hvac-techs-guide-for-understanding-superheat (Year: 2019).*

Robert Knight, "Whole House Contracting Protocols Project; vol. 2; Reference Manual for Instructors: Best Practice Protocols for Home Performance Contractors", Mar. 2007, California Energy Commission, p. 215 (Year: 2007).*

Emerson Climate Technologies, "Scroll Compressors for Refrigeration, ZB15K* to ZB220K*, ZS21K* to ZS11M*, ZF06K* to ZF48K*, ZF13KVE to ZF48KVE", Copeland Scroll, 2011, 30pgs.

Heat Craft Worldwide Refrigeration, "Why and How We Use Capacity Control", available at : http://www.heatcraftrpd.com/res/pdfs/faqs/Capacity_Control.pdf, accessed May 23, 2017, 12pgs.

* cited by examiner

PERTURBATION OF EXPANSION VALVE IN VAPOR COMPRESSION SYSTEM

CROSS-REFERENCE TO RELATED APPLICATIONS

This application claims the benefit of U.S. provisional patent application Ser. No. 62/340,684, filed May 24, 2016, the entire contents of which are incorporated herein by reference.

TECHNICAL FIELD

The subject matter disclosed herein relates generally to the field of vapor compression systems, and more particularly, to perturbation of an expansion valve in a vapor compression system.

BACKGROUND

Vapor compression systems are used to provide heating or cooling for HVAC, refrigeration, etc. Vapor compression systems typically include an expansion valve between a condenser and an evaporator. The expansion valve may be thermally controlled by temperature at the outlet of the evaporator to maintain a desired degree of superheat at the outlet of the evaporator.

Unfortunately, in many applications the expansion valve does not control the suction superheat well and the primary accumulator (at the compressor inlet) overflows with liquid refrigerant. When liquid compression occurs, oil is washed out of the compressor, which has a cascade effect on the expansion valve suction superheat control. The capacity of the system has been seen to be reduced by ~30% and the expansion valve cannot re-gain control of the suction superheat. Additionally, low superheat signifies a potential for liquid refrigerant compression, which can cause high stress on the compression chamber components and can lead to decreased reliability. Furthermore, the high oil circulation ratio (OCR) signifies that less oil is maintained within the compressor shell, which can lead to higher wear on the rotor and bearing assembly and lead to decreased reliability.

BRIEF DESCRIPTION

According to one embodiment a vapor compression system includes a compressor, a first heat exchanger, an expansion valve and a second heat exchanger arranged serial refrigerant flow path; a first fan configured to direct air over the first heat exchanger; a controller coupled to the first fan and the compressor, the controller configured to: set a compressor discharge superheat limit; determine a compressor discharge superheat; compare the compressor discharge superheat to the compressor discharge superheat limit; and when the compressor discharge superheat is less than the compressor discharge superheat limit, the controller reducing at least one of a compressor speed and a first fan speed.

In addition to one or more of the features described above, or as an alternative, further embodiments may include wherein when the compressor discharge superheat is less than the compressor discharge superheat limit, the controller reduces both the compressor speed and the first fan speed.

In addition to one or more of the features described above, or as an alternative, further embodiments may include wherein the controller is configured to delay after reducing at least one of the compressor speed and the first fan speed; after the delay, the controller is configured to compare the compressor discharge superheat to the compressor discharge superheat limit.

In addition to one or more of the features described above, or as an alternative, further embodiments may include wherein the controller is configured to compare a compressor discharge superheat variance to a compressor discharge superheat variance limit; the controller configured to reduce the at least one of the compressor speed and the first fan speed when both the compressor discharge superheat is less than the compressor discharge superheat limit and the compressor discharge superheat variance is greater than the compressor discharge superheat variance limit.

In addition to one or more of the features described above, or as an alternative, further embodiments may include wherein the controller is configured to return the first fan speed and the compressor speed to demand levels when the compressor discharge superheat is greater than the compressor discharge superheat limit.

In addition to one or more of the features described above, or as an alternative, further embodiments may include wherein the controller is configured to determine the compressor discharge superheat in response to temperature and pressure at a discharge outlet of the compressor.

In addition to one or more of the features described above, or as an alternative, further embodiments may include wherein the controller is configured to determine the compressor discharge superheat in response to temperature at a discharge outlet of the compressor and temperature at the first heat exchanger.

According to another embodiment a method for operating a vapor compression system having a compressor, a first heat exchanger, an expansion valve and a second heat exchanger arranged serial refrigerant flow path, and a first fan configured to direct air over the first heat exchanger, the method including setting a compressor discharge superheat limit; determining a compressor discharge superheat; comparing the compressor discharge superheat to the compressor discharge superheat limit; and when the compressor discharge superheat is less than the compressor discharge superheat limit, reducing at least one of a compressor speed and a first fan speed.

In addition to one or more of the features described above, or as an alternative, further embodiments may include when the compressor discharge superheat is less than the compressor discharge superheat limit, reducing both the compressor speed and the first fan speed.

In addition to one or more of the features described above, or as an alternative, further embodiments may include providing a delay after reducing at least one of the compressor speed and the first fan speed; after the delay, comparing the compressor discharge superheat to the compressor discharge superheat limit.

In addition to one or more of the features described above, or as an alternative, further embodiments may include comparing a compressor discharge superheat variance to a compressor discharge superheat variance limit; and reducing the at least one of the compressor speed and the first fan speed when both the compressor discharge superheat is less than the compressor discharge superheat limit and the compressor discharge superheat variance is greater than the compressor discharge superheat variance limit.

In addition to one or more of the features described above, or as an alternative, further embodiments may include returning the first fan speed and the compressor speed to demand levels when the compressor discharge superheat is greater than the compressor discharge superheat limit.

In addition to one or more of the features described above, or as an alternative, further embodiments may include determining the compressor discharge superheat is in response to temperature and pressure at a discharge outlet of the compressor.

In addition to one or more of the features described above, or as an alternative, further embodiments may include determining the compressor discharge superheat is in response to temperature at a discharge outlet of the compressor and temperature at the first heat exchanger.

Technical effects of embodiments of the disclosure include the ability to perturb an expansion valve when the compressor discharge superheat is below a compressor discharge superheat limit.

These and other advantages and features will become more apparent from the following description taken in conjunction with the drawings.

BRIEF DESCRIPTION OF THE DRAWINGS

The foregoing and other features, and advantages of the disclosure are apparent from the following detailed description taken in conjunction with the accompanying drawings in which.

DETAILED DESCRIPTION

Figure 1:
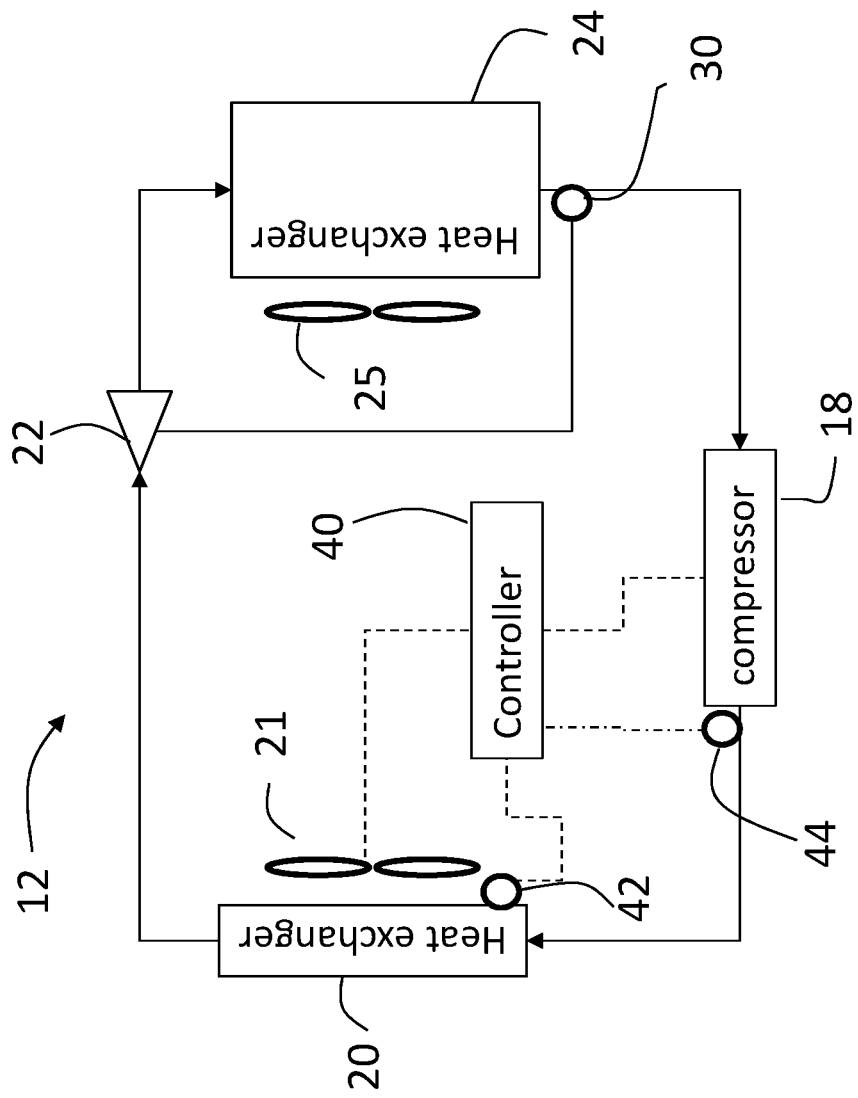
FIG. 1 depicts a refrigerant vapor compression system in an embodiment.

FIG. 1 depicts a refrigerant vapor compression system 12 in an embodiment. The vapor compression system 12 may be part of an air conditioning system. The vapor compression system 12 includes a compressor 18, first heat exchanger 20 (e.g., condenser/gas cooler), an expansion valve 22 and a second heat exchanger 24 (e.g., an evaporator) in a serial refrigerant flow path. In operation in a cooling mode, gaseous refrigerant is induced into compressor 18 and compressed. After the refrigerant is compressed, the high temperature, high pressure refrigerant gas is supplied to first heat exchanger 20. In first heat exchanger 20, the gaseous refrigerant condenses into liquid as it gives up heat to another fluid (e.g., air). A first fan 21 may direct a fluid (e.g., air) over the first heat exchanger 20, such that heat is removed from the refrigerant.

The liquid refrigerant passes through expansion valve 22 to reduce pressure and then flows to a second heat exchanger 24 (e.g., an evaporator). In the second heat exchanger 24, the refrigerant changes state to a gas and absorbs heat from a fluid (e.g., air) passing over evaporator 24. A second fan 25 may direct a fluid (e.g., air) over the second heat exchanger 24, such that heat is absorbed by the refrigerant thereby cooling the air passing over the second heat exchanger 24. The cooled air may be directed to a conditioned space to provide cooling. The low pressure vapor existing the second heat exchanger 24 is then drawn into the inlet of compressor 18 and the cycle is continually repeated.

The expansion valve 22 has a variable opening which is controlled by the temperature of the refrigerant at the outlet of the second heat exchanger 24. A sense bulb 30 is positioned at the outlet of the second heat exchanger 24 and is connected by a tube to the expansion valve 22. As known in the art, the temperature at sense bulb 30 controls the opening of expansion valve 22 to maintain a desired superheat at the outlet of the second heat exchanger 24.

The vapor compression system 12 includes a controller 40 to monitor conditions of the vapor compression system 12 and adjust operating parameters accordingly. The controller 40 may be implemented using a microprocessor executing a computer program stored on a storage medium to perform the operations described herein. Alternatively, the controller 40 may be implemented in hardware (e.g., ASIC, FPGA) or in a combination of hardware/software. The controller 40 senses conditions of the vapor compression system 12 through one or more sensors. A temperature sensor 42 may measure refrigerant temperature at the first heat exchanger 20. The temperature sensor 42 may be positioned on the first heat exchanger 20 such that the temperature measured is the condensation temperature. A temperature and/or pressure sensor 44 may measure refrigerant temperature and/or refrigerant pressure at the discharge outlet of the compressor 18. These sensed conditions may be used to control operating parameters of the vapor compression system 12 as disclosed in further detail herein.

The controller 40 may also issues commands to components of the vapor compression system 12. For example, the controller 40 may control the speed of fan 21 to control air flow over the first heat exchanger 20. The controller 40 may also control the speed of the compressor 18, to increase or decrease the degree of vapor compression.

As noted above, in some situations, the expansion valve 22 does not properly control the compressor suction superheat, resulting in liquid entering the compressor 18 resulting in loss of capacity and potential damage to the compressor 18. Embodiments detect when the expansion valve 22 is not effectively controlling compressor suction superheat and perturb the expansion valve 22, by controlling components of the vapor compression system 12, such that the expansion valve 22 regains proper control of compressor suction superheat.

Figure 2:
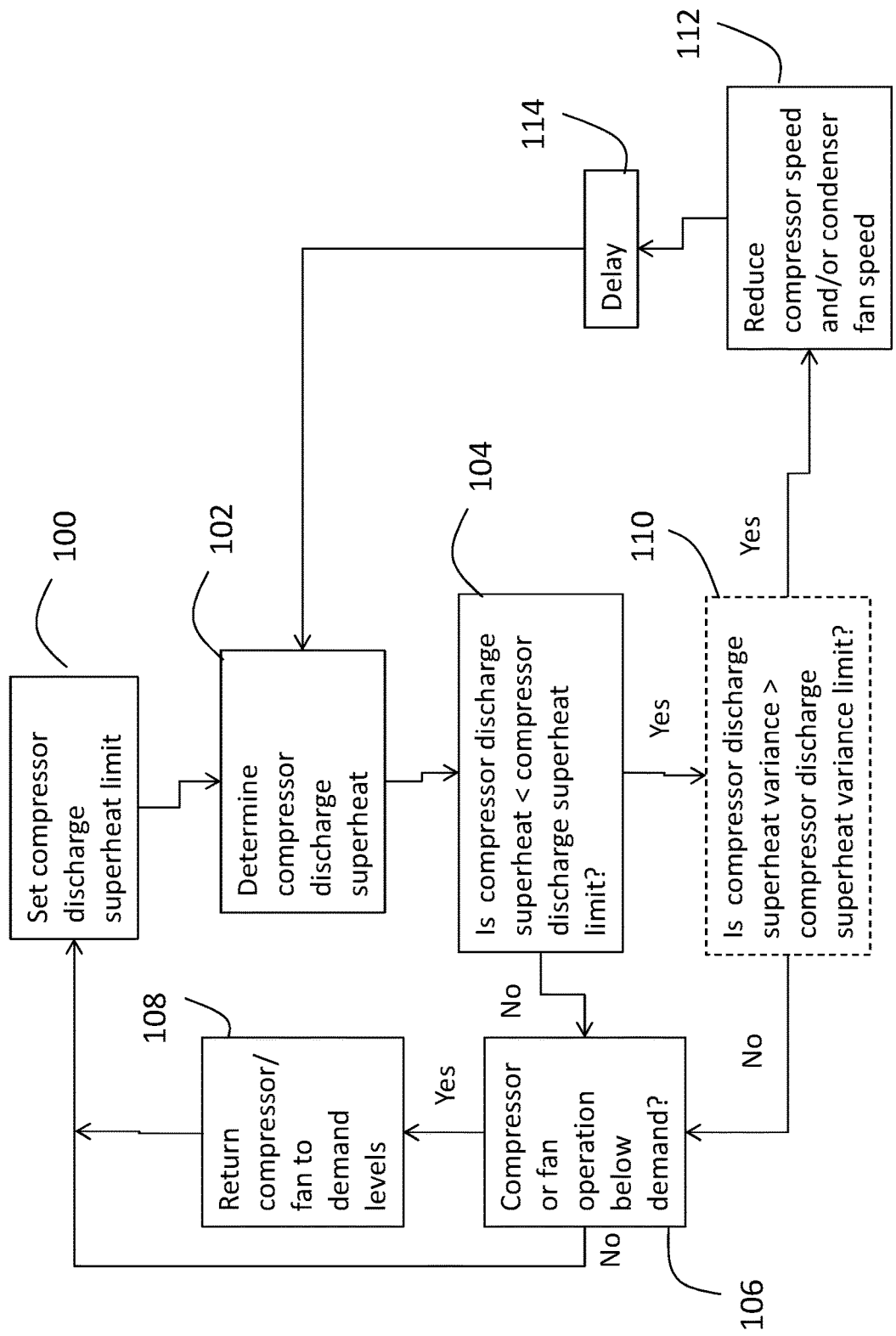
FIG. 2 depicts a process for controlling the refrigerant vapor compression system in an embodiment.

FIG. 2 depicts a process for controlling the refrigerant vapor compression 12 system in an embodiment. The process begins at 100 where the controller 40 sets a compressor discharge superheat limit. The compressor discharge superheat limit may represent a minimum compressor discharge superheat that the vapor compression system 12 can experience before liquid begins entering the compressor 18. The compressor discharge superheat limit may be influenced by a number of factors, including the type of vapor compression system 12 employed (e.g., compressor type), outdoor ambient temperature, refrigerant temperature/pressure at the suction inlet of the compressor 18, refrigerant temperature at the first heat exchanger 20, etc.

At 102, the controller 40 determines the compressor discharge superheat. This may be performed in a number ways, which are known in the art. For example, sensor 44 may be used to determined pressure and temperature of the refrigerant at the discharge outlet of the compressor 18. These values may be used to determine the compressor discharge superheat. In another example, compressor discharge superheat is determined by the difference between refrigerant temperature at the discharge outlet of the compressor 18 from sensor 44 and the temperature of the refrigerant at first heat exchanger 20 from sensor 42. It is understood that other techniques may be used to determine the compressor discharge superheat at block 102.

At 104, the controller 40 determines if the compressor discharge superheat is less than the compressor discharge superheat limit. If so, flow may optionally proceed to 110, where the controller 40 determines if a compressor discharge superheat variance is greater than a compressor discharge superheat variance limit. In some embodiments, the variance of the compressor discharge superheat is used to indicate if perturbation of the expansion valve is needed. The variance may be represented by a period or frequency of the compressor discharge superheat and an amplitude of the compressor discharge superheat. If the variance of the compressor discharge superheat exceeds compressor discharge superheat variance limit at 110, flow proceeds to 112. If block 110 is not used, then a positive result at 104 results in the process flowing to 112.

At 112, the controller 40 performs operations to perturb the expansion valve 22, in an attempt to have the expansion valve 22 operate properly and raise the superheat. Controller 40 may perform a variety of operations to adjust the operating conditions of the vapor compression system 12, including reducing the speed of compressor 18 and/or reducing the speed of fan 21. Both these adjustments should result in an increase of compressor discharge superheat. The controller 40 may adjust the operating conditions by a set amount (e.g., reduce by 10% of current value). At 114, the controller 40 waits for a delay period (e.g., 3 minutes to 10 minutes) until flow returns to 102.

At 104, if the compressor discharge superheat is greater than the compressor discharge superheat limit, this indicates that the expansion valve 22 is effectively controlling superheat. Flow proceeds to 106 where the controller 40 determines if either of the fan 21 or the compressor 18 is operating below a demand level. This indicates that the speed of fan 21 or speed of compressor 18 was reduced to perturb the expansion valve 22. If so, flow proceeds to 108 where the controller 40 returns the speed of the fan 21 and/or the speed of the compressor 18 to meet current demand levels.

Embodiments provide for perturbing the expansion valve such that it regains control of the suction superheat and allows refrigerant vapor to be compressed. By perturbing the expansion valve and causing it to control to a higher superheat and higher stability, the negative impacts to the capacity and efficiency, rotor and bearing wear, and compression chamber component reliability can be reduced. Embodiments provide a means to maintain the reliability and performance of the vapor compression system across a wide range of applications.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A vapor compression system comprising:
a compressor, a first heat exchanger, an expansion valve and a second heat exchanger arranged serially in a refrigerant flow path;
a first fan configured to direct air over the first heat exchanger;
a controller coupled to the first fan and the compressor, the controller configured to:
set a compressor discharge superheat limit;
determine a compressor discharge superheat;
compare the compressor discharge superheat to the compressor discharge superheat limit; and
when the compressor discharge superheat is less than the compressor discharge superheat limit, the controller reduces both the compressor speed and a first fan speed.

2. The vapor compression system of claim 1, wherein:
the controller is configured to delay after reducing at least one of the compressor speed and the first fan speed;
after the delay, the controller is configured to compare the compressor discharge superheat to the compressor discharge superheat limit.

3. The vapor compression system of claim 1, wherein:
the controller is configured to return the first fan speed and the compressor speed to demand levels when the compressor discharge superheat is greater than the compressor discharge superheat limit.

4. The vapor compression system of claim 1, wherein:
the controller is configured to determine the compressor discharge superheat in response to temperature and pressure at a discharge outlet of the compressor.

5. A vapor compression system comprising:
a compressor, a first heat exchanger, an expansion valve and a second heat exchanger arranged serially in a refrigerant flow path;
a first fan configured to direct air over the first heat exchanger;
a controller coupled to the first fan and the compressor, the controller configured to:
set a compressor discharge superheat limit;
determine a compressor discharge superheat;
compare the compressor discharge superheat to the compressor discharge superheat limit;
wherein the controller is configured to compare a compressor discharge superheat variance to a compressor discharge superheat variance limit;
the controller configured to reduce at least one of a compressor speed and a first fan speed when both (i) the compressor discharge superheat is less than the compressor discharge superheat limit and (ii) a period or frequency of the compressor discharge superheat and an amplitude of the compressor discharge superheat exceed the compressor discharge superheat variance limit; over time.

6. A vapor compression system comprising:
a compressor, a first heat exchanger, an expansion valve and a second heat exchanger arranged serially in a refrigerant flow path;
a first fan configured to direct air over the first heat exchanger;
a controller coupled to the first fan and the compressor, the controller configured to:
set a compressor discharge superheat limit;
determine a compressor discharge superheat;
compare the compressor discharge superheat to the compressor discharge superheat limit; and
when the compressor discharge superheat is less than the compressor discharge superheat limit, the controller reducing at least one of a compressor speed and a first fan speed
wherein the controller is configured to determine the compressor discharge superheat in response to temperature at a discharge outlet of the compressor and temperature at the first heat exchanger.

7. A method for operating a vapor compression system having a compressor, a first heat exchanger, an expansion valve and a second heat exchanger arranger serially in a refrigerant flow path, and a first fan configured to direct air over the first heat exchanger, the method comprising:
  setting a compressor discharge superheat limit;
  determining a compressor discharge superheat;
  comparing the compressor discharge superheat to the compressor discharge superheat limit;
  when the compressor discharge superheat is less than the compressor discharge superheat limit, reducing both the compressor speed and a first fan speed.

8. The method of claim 7, further comprising:
  providing a delay after reducing at least one of the compressor speed and the first fan speed;
  after the delay, comparing the compressor discharge superheat to the compressor discharge superheat limit.

9. The method of claim 7, further comprising:
  returning the first fan speed and the compressor speed to demand levels when the compressor discharge superheat is greater than the compressor discharge superheat limit.

10. The method of claim 7, wherein:
  the compressor discharge superheat is determined in response to temperature and pressure at a discharge outlet of the compressor.

11. A method for operating a vapor compression system having a compressor, a first heat exchanger, an expansion valve and a second heat exchanger arranged serial refrigerant flow path, and a first fan configured to direct air over the first heat exchanger, the method comprising:
  setting a compressor discharge superheat limit;
  determining a compressor discharge superheat;
  comparing the compressor discharge superheat to the compressor discharge superheat limit; and
  comparing a compressor discharge superheat variance to a compressor discharge superheat variance limit; and
  reducing at least one of a compressor speed and a first fan speed when both (i) the compressor discharge superheat is less than the compressor discharge superheat limit and (ii) a period or frequency of the compressor discharge superheat and an amplitude of the compreor discharge superheat exceed the compressor discharge superheat variance limit.

12. A method for operating a vapor compression system having a compressor, a first heat exchanger, an expansion valve and a second heat exchanger arranged serial refrigerant flow path, and a first fan configured to direct air over the first heat exchanger, the method comprising:
  setting a compressor discharge superheat limit;
  determining a compressor discharge superheat;
  comparing the compressor discharge superheat to the compressor discharge superheat limit; and
  when the compressor discharge superheat is less than the compressor discharge superheat limit, reducing at least one of a compressor speed and a first fan speed
  wherein the compressor discharge superheat is determined in response to temperature at a discharge outlet of the compressor and temperature at the first heat exchanger.

* * * * *